(12) United States Patent
Iida et al.

(10) Patent No.: US 8,910,993 B2
(45) Date of Patent: Dec. 16, 2014

(54) COWLING STRUCTURE OF RIDING-TYPE VEHICLE

(75) Inventors: Omi Iida, Saitama (JP); Jun Hirose, Saitama (JP); Shigeto Inami, Saitama (JP); Katsumasa Ieda, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 53 days.

(21) Appl. No.: 13/574,649

(22) PCT Filed: Jan. 19, 2011

(86) PCT No.: PCT/JP2011/050850
§ 371 (c)(1),
(2), (4) Date: Jul. 23, 2012

(87) PCT Pub. No.: WO2011/093184
PCT Pub. Date: Aug. 4, 2011

(65) Prior Publication Data
US 2012/0292948 A1 Nov. 22, 2012

(30) Foreign Application Priority Data
Jan. 27, 2010 (JP) .................................. 2010-015234

(51) Int. Cl.
*B62J 17/00* (2006.01)
*B62J 17/02* (2006.01)

(52) U.S. Cl.
CPC ....................................... *B62J 17/02* (2013.01)
USPC ........................................... 296/91; 296/78.1

(58) Field of Classification Search
CPC ....................................................... B62J 17/02
USPC ............ 296/78.1, 192, 91, 208, 77.1, 136.08, 296/206, 187.01, 180.1; 180/68.1
See application file for complete search history.

(56) References Cited

U.S. PATENT DOCUMENTS

| | | | |
|---|---|---|---|
| 4,911,494 A * | 3/1990 | Imai et al. | 296/78.1 |
| 5,409,287 A * | 4/1995 | Suzuki | 296/180.1 |
| 6,619,415 B1* | 9/2003 | Hasumi et al. | 180/68.1 |
| 6,871,888 B2* | 3/2005 | Yamagiwa | 293/102 |
| 7,032,948 B2* | 4/2006 | Khan | 296/78.1 |
| D567,715 S * | 4/2008 | Brew et al. | D12/110 |

(Continued)

FOREIGN PATENT DOCUMENTS

| | | |
|---|---|---|
| JP | 63-082889 A | 4/1988 |
| JP | 1-306383 A | 12/1989 |
| JP | 7-242188 A | 9/1995 |
| JP | 2006-347343 A | 12/2006 |

*Primary Examiner* — Pinel Romain
(74) *Attorney, Agent, or Firm* — Carrier Blackman & Associates, P.C.; William D. Blackman; Michael J. McCandlish

(57) ABSTRACT

A cowling structure includes a head pipe mounted to the front of a body frame, a steering gear held such that it is capable of pivoting about the axis of the head pipe, side cowls each arranged at the transverse outside of the body frame, together with an opening so formed in each side cowl that it communicates with the transverse outside and inside of each side cowl. When viewed in a side view, the side cowls are lengthened up to the fore of the head pipe, and the opening is in such a position that it is level with the head pipe and overlaps with the steering gear in the fore of the head pipe. Such cowling structure permits less damages to the external appearance while providing the improvement in the lightness of banking at the time in the early stage of turning of a vehicle body.

7 Claims, 21 Drawing Sheets

(56) References Cited

U.S. PATENT DOCUMENTS

| | | |
|---|---|---|
| 7,370,902 B2 | 5/2008 | Seki et al. |
| 7,556,115 B2 * | 7/2009 | Iwanaga .................. 180/229 |
| D600,373 S * | 9/2009 | Brew et al. .................. D26/28 |
| 7,669,682 B2 * | 3/2010 | Holroyd et al. ............... 180/227 |
| 7,703,831 B2 * | 4/2010 | Matsuo et al. ................ 296/91 |
| D615,001 S * | 5/2010 | Kishi et al. ................ D12/114 |
| D625,669 S * | 10/2010 | Ohashi et al. ................ D12/114 |
| 7,883,136 B2 * | 2/2011 | Tomolillo et al. ............ 296/78.1 |
| 7,963,354 B2 * | 6/2011 | Miyakawa et al. .......... 180/68.3 |
| 8,006,792 B2 * | 8/2011 | Nakao et al. .............. 180/68.1 |
| 8,136,865 B1 * | 3/2012 | Beck ....................... 296/136.08 |
| 8,177,250 B2 * | 5/2012 | Fukuyama et al. ........ 280/288.4 |
| 2007/0004329 A1 * | 1/2007 | Miyakawa et al. .......... 454/299 |
| 2007/0024089 A1 * | 2/2007 | Takeshita ..................... 296/192 |
| 2010/0001551 A1 * | 1/2010 | Fukuyama et al. .......... 296/192 |

\* cited by examiner

COWLING STRUCTURE OF RIDING-TYPE VEHICLE

TECHNICAL FIELD

This invention relates to a cowling structure of a riding-type vehicle, mainly to a technology applied to lighten banking at the time in the early stage of turning of a vehicle body.

BACKGROUND ARTS

Conventionally, a cowling structure as described in Patent document 1 is well known as one cowling structure of a riding-type vehicle, for instance. Referring to the Patent document 1 with reference to numerals shown therein, this cowling structure of the riding-type vehicle is of a type that each side cowl (50) covering the side surface of the front of a motorcycle has an opening (83) applied to lighten banking at the time in the early stage of turning of a vehicle body.

REFERENCE DOCUMENT ON THE PRIOR ARTS

Patent Document

[Patent Document 1] Japanese Laid-open Patent Publication No. 2006-347343

SUMMARY OF THE INVENTION

Problems to be Solved by the Invention

For the cowling structure of the riding-type vehicle in the above prior art, the opening (83) of each side cowl (50) has been formed sideways in a location of an internal structure (a radiator (36) and/or an engine cylinder unit (26a), for instance) of a vehicle.

For that reason, the internal structure has been liable to obstruct the flow of air tending to pass through the opening (83), and as a result, it could be not always said that banking at the time in the early stage of turning of the vehicle body meets satisfactory lightness. Thus, it has been necessary for the cowling structure in the prior art to enlarge the opening (83), if an attempt to improve the lightness of banking described the above has been made. The enlargement of the opening has caused the internal structure to be easily exposed to view through the opening (83), resulting in a fear of damages to the external appearance.

An object of the present invention is to provide a cowling structure of a riding-type vehicle, more specifically, a cowling structure which permits less damages to the external appearance as well, while providing the improvement in the lightness of banking at the time in the early stage of turning of a vehicle body.

Means for Solving the Problem

To solve the above problem, a cowling structure of a riding-type vehicle according to the present invention comprises a head pipe mounted to the front of a body frame, a steering gear supporting a front wheel rotatably, while being so held with the head pipe that it is capable of pivoting about the axis of the head pipe in the fore of the head pipe, side cowls each arranged at the transverse outside of the body frame, and an opening so formed in each side cowl that it communicates with the transverse inside and outside of each side cowl, wherein in side view, the side cowls are lengthened up to the fore of the head pipe, and the opening is in such a position that it is level with the head pipe and overlaps with the steering gear in the fore of the head pipe.

According to the cowling structure of the riding-type vehicle of the present invention, the side cowls are lengthened up to the fore of the head pipe in side view, thus allowing the straightening effect obtained with the side cowls to be heightened.

Further, the opening is in such a position that it is level with the head pipe and overlaps with the steering gear in the fore of the head pipe in side view, thus allowing the flow of air passing through the opening to be made better. The steering gear is so held with the head pipe that it is capable of pivoting about the axis of the head pipe in the fore of the head pipe, resulting in that no obstacle to the pivoting motion of the steering gear exists in the fore of the head pipe. In other words, it follows that a space allowing for the pivoting motion of the steering gear is ensured in the fore of the head pipe. The opening according to the present invention is in such a position that it corresponds to this space, or is level with the head pipe and overlaps with the steering gear in the fore of the head pipe in side view, thus allowing the presence of the space to better the flow of air passing through the opening.

As the result of betterment of the flow of air passing through the opening, the opening of the present invention may cause the lightness of banking at the time in the early stage of turning of the vehicle body to be improved without the need to enlarge the opening as much as the opening (83) in the prior art. Accordingly, less exposure of the internal structure to view becomes attainable.

Specifically, it is understood that the cowling structure of the riding-type vehicle of the present invention offers the advantage of permitting less damages to the external appearance as well, while providing the improvement in the lightness of banking at the time in the early stage of turning of the vehicle body.

It is desirable to take an arrangement that each side cowl is in the form of a cowl having an upper cowl arranged at the top of the vehicle and a middle cowl arranged below the upper cowl, wherein a top end of the middle cowl is located more outside in the transverse direction than a bottom end of the upper cowl, while the top end of the middle cowl and the bottom end of the upper cowl are so located that they overlap with each other in side view, wherein with the opening formed in the upper cowl, at least part of the opening is covered with the middle cowl top end located away in the transverse direction from the opening in side view.

Taking this arrangement makes it possible that at least part of the opening appears to be covered with the top end of the middle cowl in side view, even if a large-sized opening is formed. Accordingly, it is possible to meet both the more improvement in the above lightness and the external appearance.

It is more desirable to take an arrangement that a slant sloping more outward in the transverse direction of the vehicle body with the distance nearer to the top is formed at the top of the opening in the upper cowl.

Taking this arrangement makes it possible that the air is admitted into the opening by taking advantage of the slant at the time of banking of the vehicle, so that an area of the opening may be effectively applied to improve the above lightness, even if part of the opening is covered with the middle cowl.

It is also desirable to take an arrangement that a blade having an upper surface in the form of a slant surface sloping more downward with the distance nearer to the fore is formed at the fore of the opening.

Taking this arrangement makes it possible that the blade causes the ground pressure of the front wheel to be increased, and also that the lightness at the time in the early stage of turning of the vehicle body is improved as well from the point of view in which the opening is located at the rear of the blade so that clinging of a run stream to the cowl surface when occurs behind the blade is suppressed.

It is more desirable to take an arrangement that the blade has at the transverse outside a projection extending upward from the blade.

Taking this arrangement makes it possible that the run stream is so controlled that it flows in the longitudinal direction of the vehicle by applying the projection to suppress the phenomenon that the flow of the run stream at the blade is diffused in the transverse direction, thus allowing the straightening effect in the blade to be heightened.

It is further desirable to take an arrangement that a screen is arranged at the fore of the steering gear, and the opening is exposed to the outside above the blade, in front view of the vehicle.

Taking this arrangement makes it possible that the run stream having been straightened with the blade is led to a rider side by taking advantage of the pivoting space of the steering gear, thus allowing not only the effect of protecting a rider against wind to be heightened with the screen but also an adequate degree of run stream to be given to a rider, while allowing a negative pressure generated at the rear of the screen to be suppressed.

EMBODIMENT OF THE INVENTION

One embodiment of a cowling structure of a riding-type vehicle according to the present invention will now be described with reference to the attached drawings.

Figure 1:
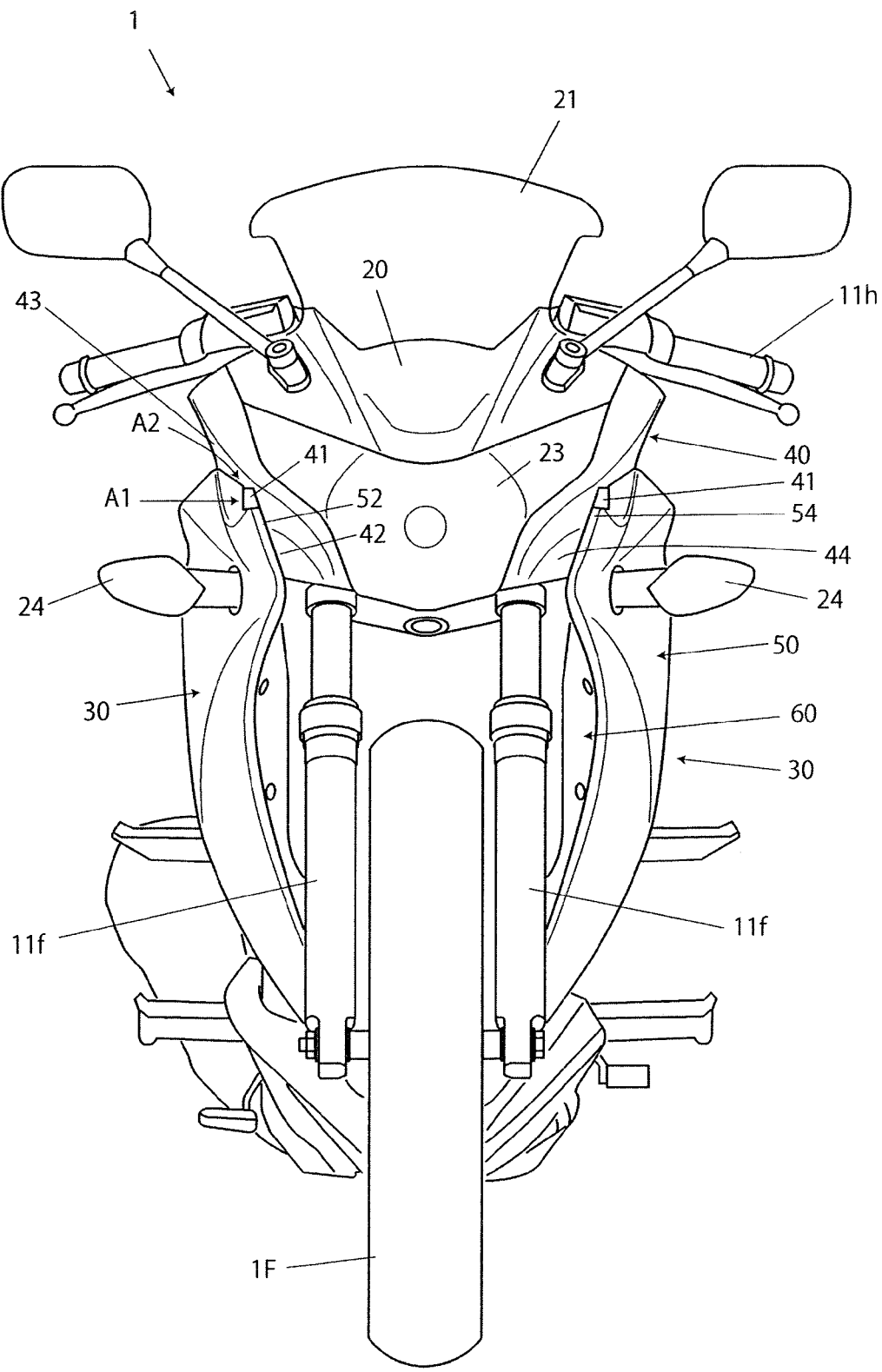
FIG. 1 is a front view of a motorcycle as one instance of a riding-type vehicle involving the use of a cowling structure of the riding-type vehicle according to the present invention.
Figure 2:
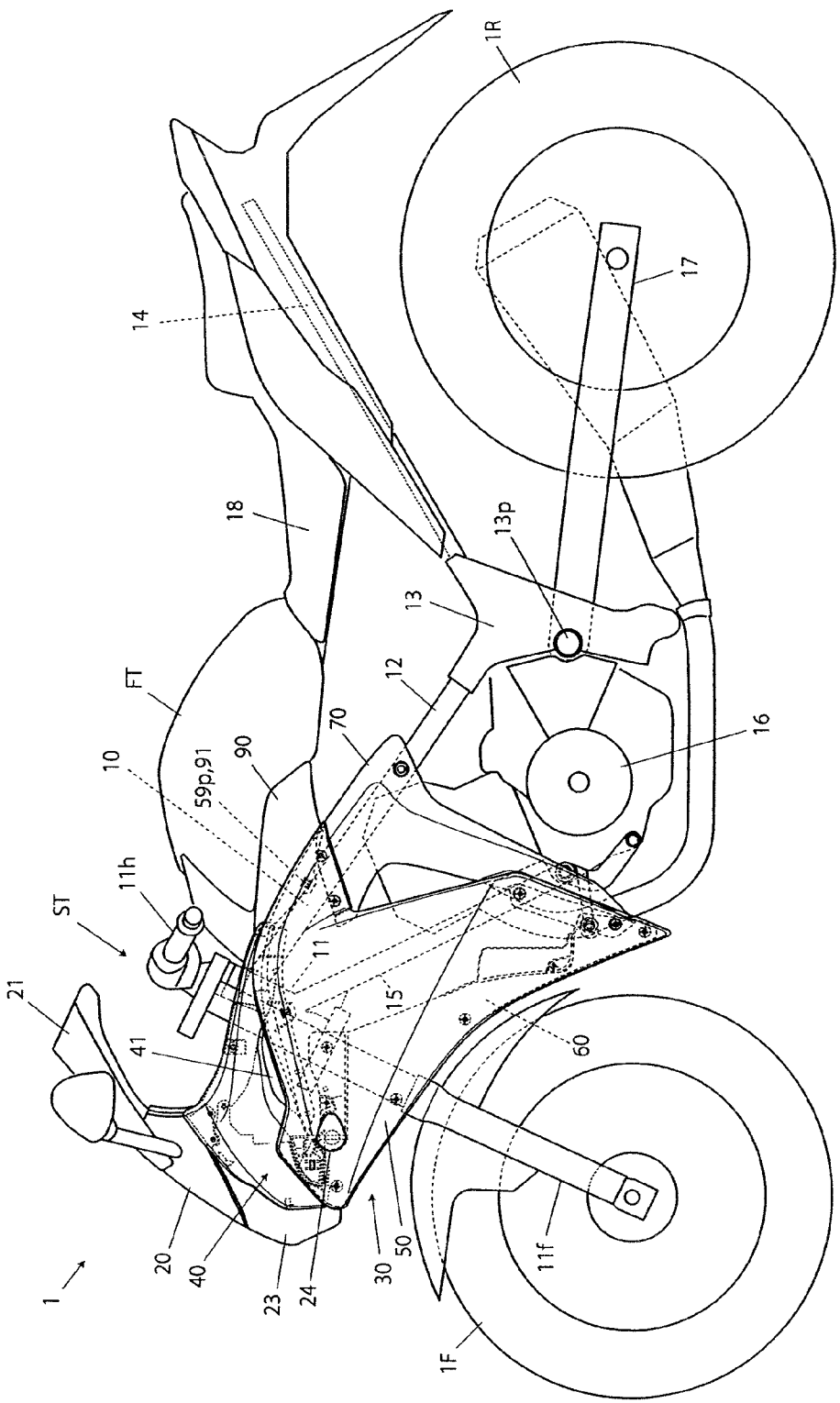
FIG. 2 is a side view of the same as that of FIG. 1.
Figure 3:
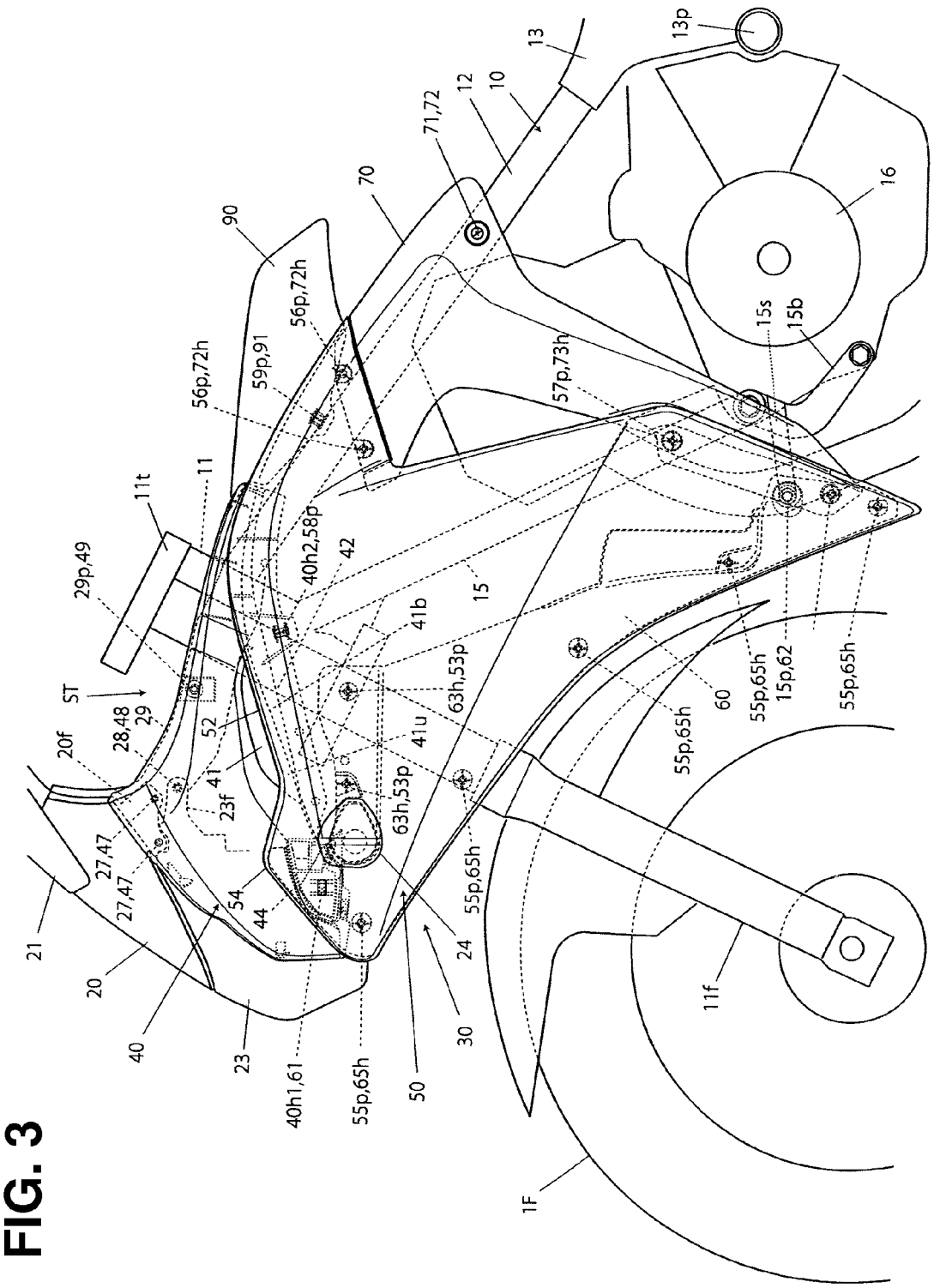
FIG. 3 is an enlarged partial side view of the same as that of FIG. 1.
Figure 4:
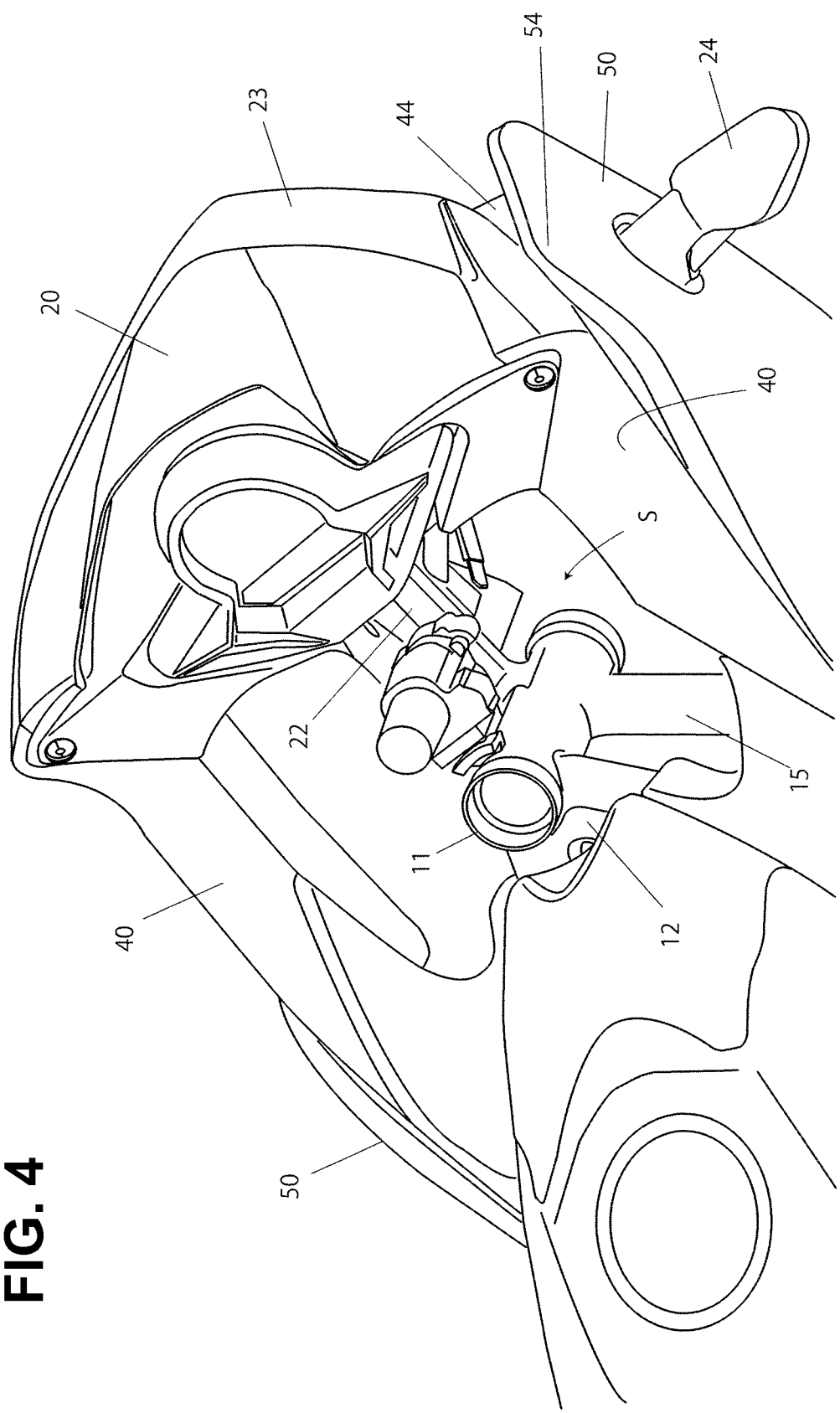
FIG. 4 is a perspective view of the front of a head pipe of the same as that of FIG. 1, as seen from above slantwise.
Figure 5:
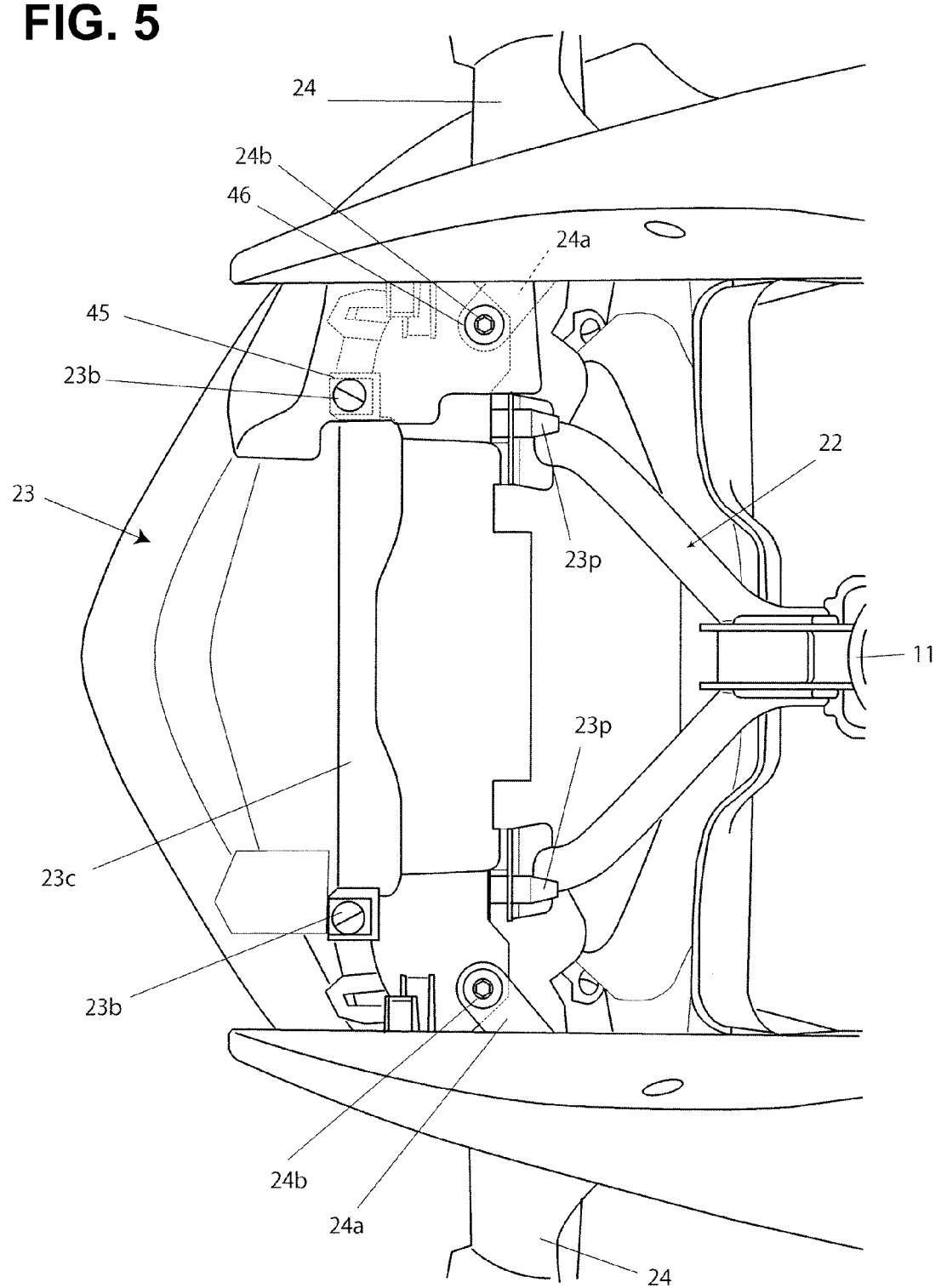
FIG. 5 is a bottom view of the front of the same as that of FIG. 4.
Figure 6:
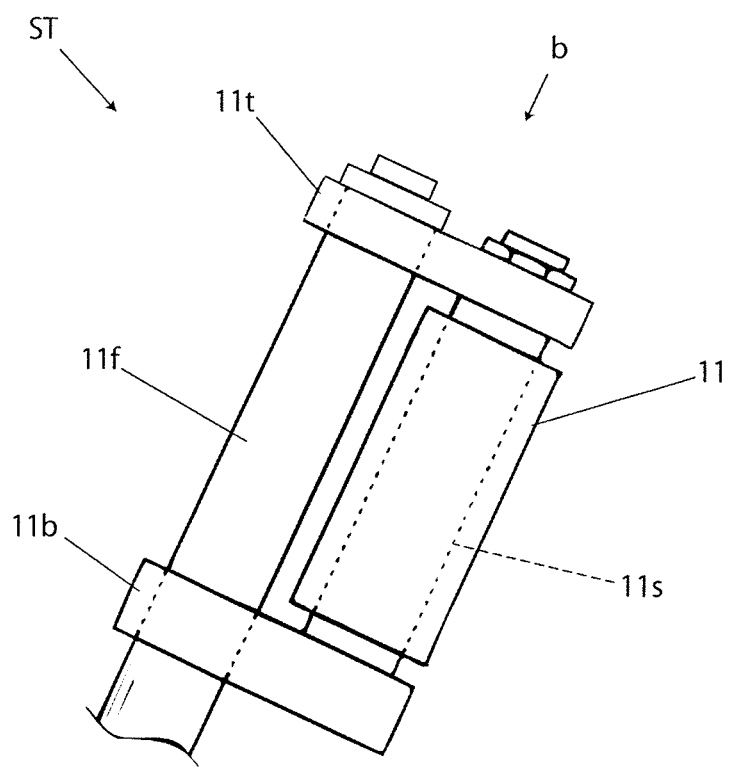
FIG. 6 is a schematic side view of one instance of a steering gear.
Figure 7:
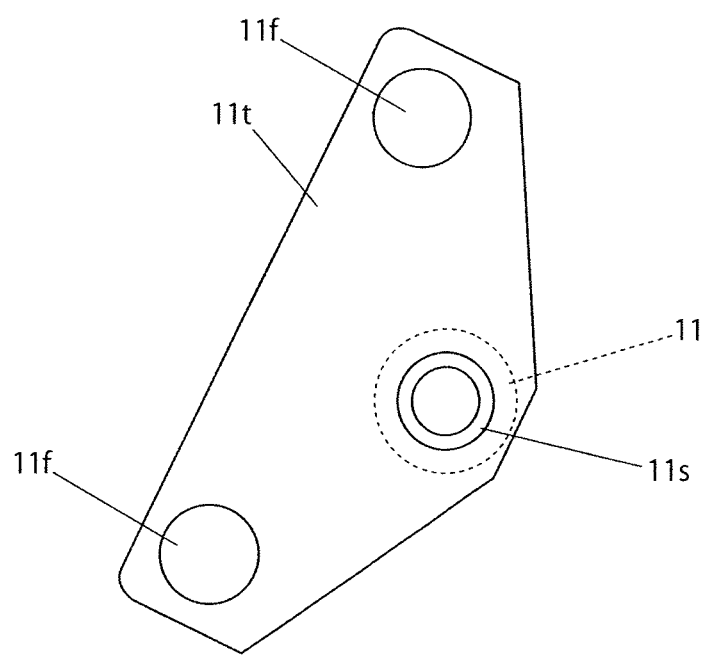
FIG. 7 is a view taken in the direction of an arrow b in FIG. 6.

FIG. 1 is a front view of a motorcycle as one instance of a riding-type vehicle involving the use of a cowling structure of the riding-type vehicle according to the present invention. FIG. 2 is a side view of the same as that of FIG. 1. FIG. 3 is an enlarged partial side view of the same as that of FIG. 1. FIG. 4 is a perspective view of the front of a head pipe of the same as that of FIG. 1, as seen from above slantwise. FIG. 5 is a bottom view of the front of the same as that of FIG. 4. FIG. 6 is a schematic side view of one instance of a steering gear. FIG. 7 is a view taken in the direction of an arrow b in FIG. 6.

A motorcycle 1 as illustrated has a body frame 10 forming a vehicle body. The body frame 10 has a head pipe 11 constituting a front end of the body frame 10, a main frame 12 extending rearward from the head pipe 11, a pivot plate 13 mounted to the rear of the main frame 12, a seat rail 14 extending rearward from the pivot plate 13 and the main frame 12, and a down tube 15 extending downward in the rearward direction from the head pipe 11.

A steering gear ST is so held with the head pipe 11 that it is capable of pivoting about the axis of the head pipe 11 in the fore of the head pipe 11.

A well-known basic structure may be applied to constitute the steering gear ST. As shown in FIGS. 6 and 7, for instance, the steering gear ST may be of structure that a stem shaft 11s is pivotally supported with the head pipe 11 to join a top bridge 11t and a bottom bridge 11b to the top and the bottom of the stem shaft 11s, and a pair of front forks 11f are supported with the top bridge 11t and the bottom bridge 11b to fix a handle 11h (See FIG. 1) to the top bridge 11t and also to rotatably mount a front wheel 1F to the lower ends of the pair of front forks 11f.

When the rider turns the handle 11h, the steering gear ST of this type causes the front wheel 1F to be turned clockwise or counterclockwise in plan view by pivoting of the top bridge 11t, the bottom bridge 11b and the pair of front forks 11f about the stem shaft 11s, that is, the axis of the head pipe 11 in the fore the head pipe 11, thereby allowing a travelling course of the motorcycle 1 to be changed.

An engine 16 is fixed to the main frame 12, the pivot plate 13 and the down tube 15.

The pivot plate 13 is so fitted with a swing arm 17 that it is capable of swinging upward and downward through a pivot axis 13p. The rear end of the swing arm 17 is rotatably provided with a rear wheel 1R specified as a drive wheel. The rear wheel 1R is driven with the engine 16.

The seat rail 14 has on the top a seat 18 where the rider takes one's position.

The front of the vehicle body is covered with a front cowl 20 and left-side and right-side cowls 30.

The front cowl 20 is mounted to a stay 22 provided in the form of a projection extending forward from the head pipe 11, as shown in FIGS. 4 and 5.

As shown in FIGS. 1 and 2, the front cowl 20 has on the top a windscreen 21.

The side cowls 30 are each arranged at the transverse outside of the body frame 10 and is directly or indirectly fixed to the body frame 10 as described later. The side cowls 30 have each an opening 41 that communicates with the transverse inside and outside of each side cowl 30.

Chief features of the present embodiment are that in side view, the side cowls 30 are lengthened up to the fore of the head pipe 11, and the opening 41 is in such a position that it is level with the head pipe 11 and overlaps with the steering gear ST in the fore of the head pipe 11, as shown in FIGS. 2 and 3. In other words, the opening 41 is in such a position that it overlaps with a pivoting region of the steering gear ST in side view.

According to the cowling structure of the riding-type vehicle as described the above, the side cowls 30 are lengthened up to the fore of the head pipe 11 in side view, thus allowing the straightening effect obtained with the side cowls 30 to be heightened.

Further, the opening 41 is in such a position that it is level with the head pipe 11 and overlaps with the steering gear ST in the fore of the head pipe 11 in side view, thus allowing the flow of air passing through the opening 41 to be made better.

The steering gear ST is so held with the head pipe 11 that it is capable of pivoting about the axis of the head pipe 11 in the fore of the head pipe 11, resulting in that no obstacle to the pivoting motion of the steering gear ST exists in the fore of the head pipe 11. In other words, it follows that a space (the pivoting region) S allowing for the pivoting motion of the steering gear ST is ensured in the fore of the head pipe 11, as shown in FIG. 4 as well. The opening 41 according to the present embodiment is in such a position that it corresponds to the space S, or is level with the head pipe 11 and overlaps with the steering gear ST in the fore of the head pipe 11, thus allowing the presence of the space S to better the flow A1 (See FIG. 1) of air passing through the opening 41.

As the result of betterment of the flow of air passing through the opening 41, the opening 41 of the present embodiment may cause the lightness of banking at the time in the early stage of turning of the vehicle body to be improved without the need to enlarge the opening as much as the opening (83) in the prior art. Accordingly, less exposure of the internal structure (the front forks 11f and the like in this case) to view becomes attainable.

Specifically, it is understood that the cowling structure of the riding-type vehicle according to the present embodiment offers the advantage of permitting less damages to the external appearance as well, while providing the improvement in the lightness of banking at the time in the early stage of turning of the vehicle body.

Besides, inasmuch as the head pipe 11 is located at the top of the vehicle in the height direction, the opening 41 is supposed to be in this location, thus allowing the passage of air A1 to be performed in location with large transverse displacement at the time of banking of the vehicle. Accordingly, it is possible to provide the further improvement in the lightness.

It is noted that it has been necessary for the cowling structure in the above prior art to enlarge the opening (83), if an attempt to improve the lightness has been made. The enlargement of the opening has caused the internal structure to be easily exposed to view through the opening (83), resulting in difficulty in protecting the internal structure with the side cowls (50). For that reason, there has been the need to regulate the arrangement of the internal structure and/or use a separate cover or the like for protection, if an attempt to protect the internal structure has been made. Accordingly, the cowling structure in the prior art has had a fear of bringing about a reduction in the degree of freedom to the internal structure arrangement and/or an increase in the number of parts.

On the contrary, the cowling structure of the present embodiment may provide the improvement in the lightness of banking at the time in the early stage of turning of the vehicle body without the need to enlarge the opening 41 as much as the opening (83) in the prior art, and therefore, may not cause any defectives like the above, resulting in the increase in the degree of freedom to the internal structure arrangement and the elimination of the need to increase the number of parts as well.

Meanwhile, the opening (83) in the prior art takes a form that its fore is opened, and therefore, has had a fear of causing a reduction in the straightening effect obtained with the side cowls.

On the contrary, the opening 41 of the present embodiment takes a form that its fore is not opened, and therefore, may cause the straightening effect obtained with the side cowls to be maintained.

Each side cowl 30 has an upper cowl 40 arranged at the top of the vehicle and a middle cowl 50 arranged below the upper cowl 40.

Figure 8:
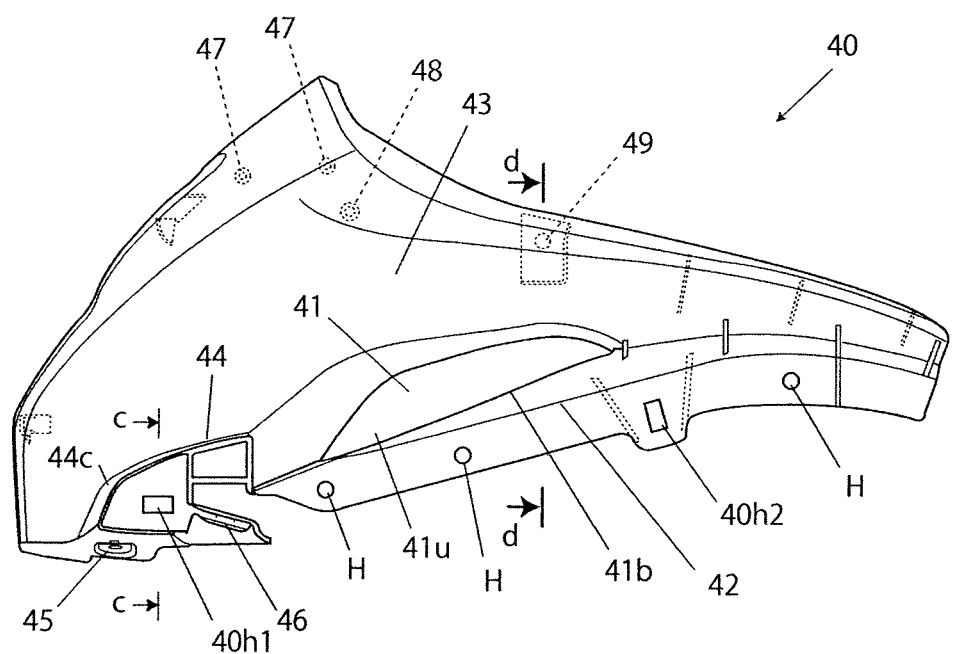
FIG. 8 is a side view of an upper cowl 40.
Figure 9:
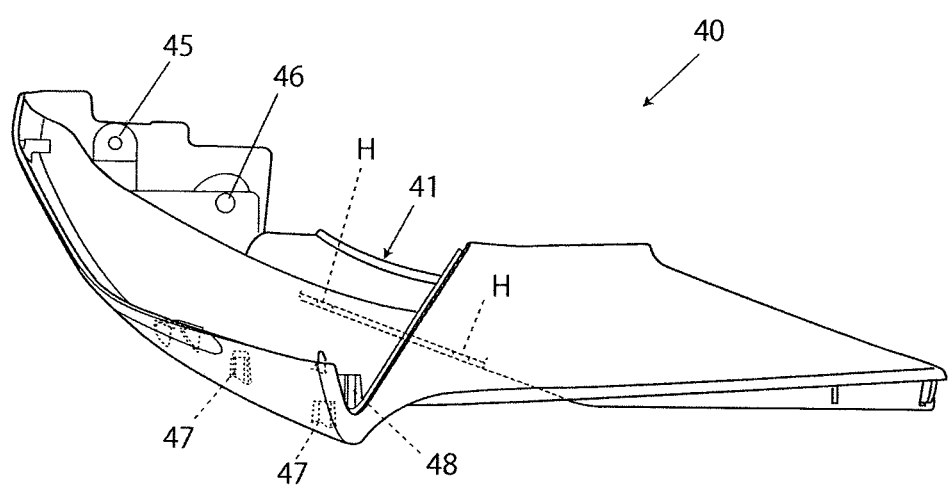
FIG. 9 is a plan view of the upper cowl of FIG. 8.
Figure 10:
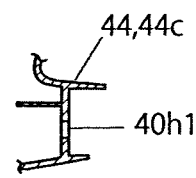
FIG. 10 is a sectional view taken along line c-c in FIG. 8.
Figure 11:
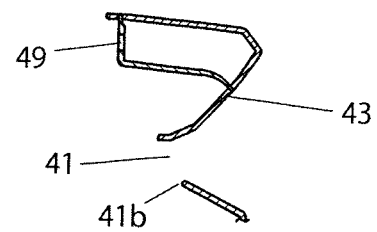
FIG. 11 is a sectional view taken along line d-d in FIG. 8.
Figure 12:
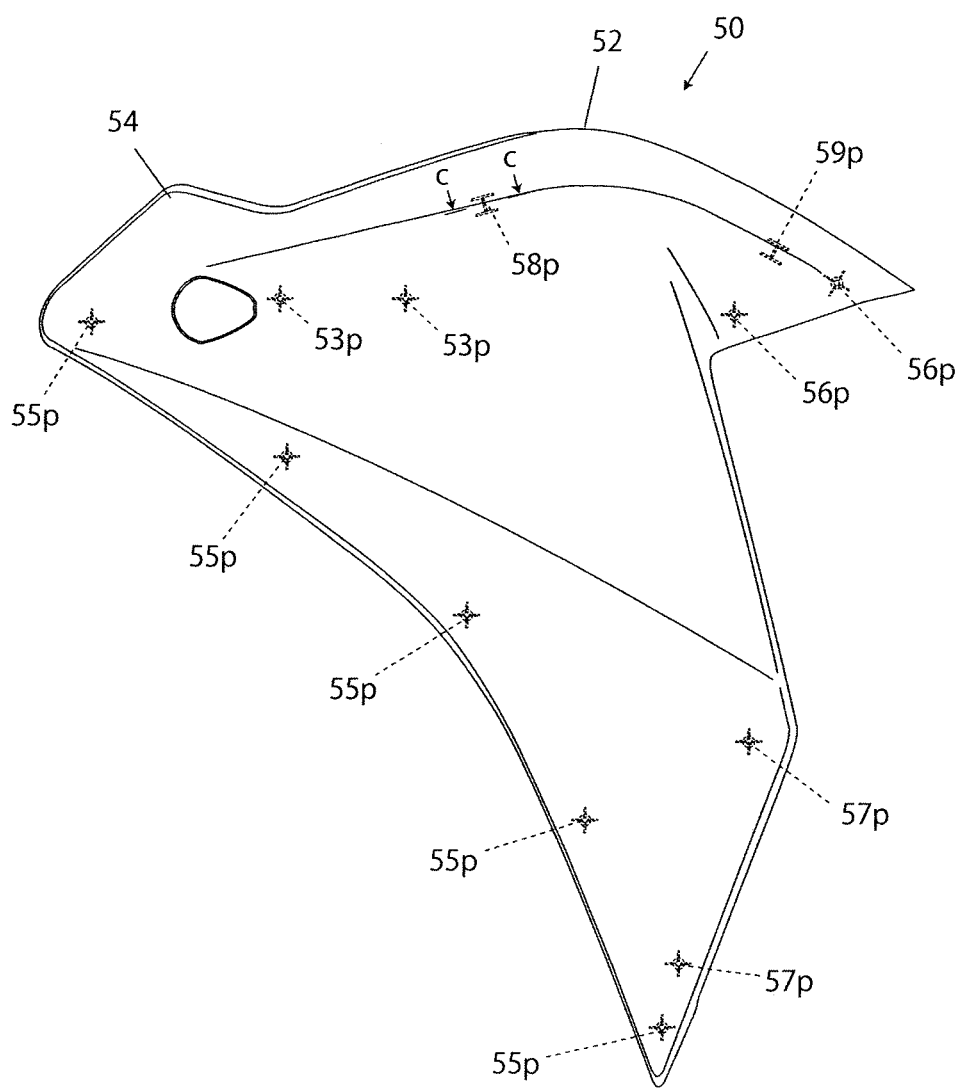
FIG. 12 is a side view of a middle cowl 50.
Figure 13:
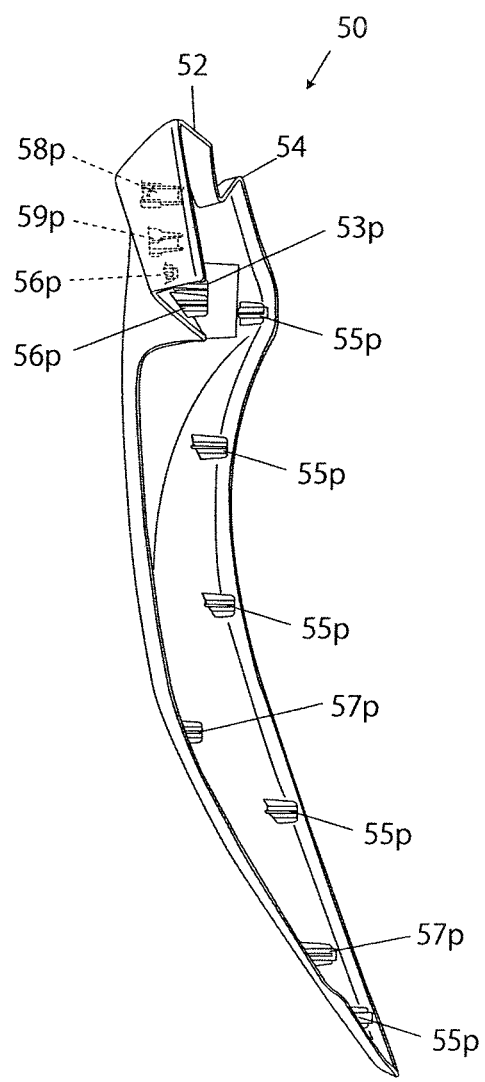
FIG. 13 is a right side view of the middle cowl of FIG. 12.
Figure 14:
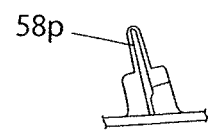
FIG. 14 is a sectional view taken along line c-c in FIG. 12.
Figure 15:
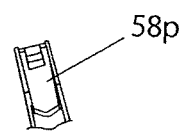
FIG. 15 is a side view of the engaging projection 58p of FIG. 14.

FIG. 8 is a side view of the upper cowl 40. FIG. 9 is a plan view of the upper cowl of FIG. 8. FIG. 10 is a sectional view taken along line c-c in FIG. 8. FIG. 11 is a sectional view taken along line d-d in FIG. 8. FIG. 12 is a side view of the middle cowl 50. FIG. 13 is a right side view of the middle cowl of FIG. 12. FIG. 14 is a sectional view taken along line c-c in FIG. 12. FIG. 15 is a side view of the engaging projection 58p of FIG. 14.

As shown in these FIGURES as well as FIGS. 1 and 3, according to the present embodiment, a top end 52 of the middle cowl 50 is located more outside in the transverse direction than a bottom end 42 of the upper cowl 40, while the bottom end 42 of the upper cowl 40 and the top end 52 of the middle cowl 50 are so located that they overlap with each other in side view as shown in FIG. 3, wherein with the opening 41 formed in the upper cowl 40, at least part (an under part 41u extending in parallel to a bottom edge 41b of the opening 41 in the present embodiment) of the opening 41 is covered with the middle cowl 50's top end 52 located away in the transverse direction from the opening 41.

Taking this arrangement makes it possible that part (the under part 41u, for instance) of the opening 41 appears to be covered with the top end 52 of the middle cowl, even if the opening 41 is enlarged. Accordingly, it is possible to meet both the external appearance and the more improvement in the lightness resulting from the enlargement of the opening 41.

A slant 43 sloping more outward in the transverse direction of the vehicle body with the distance nearer to the top is formed at the top of the opening 41 in the upper cowl 40.

Taking this arrangement makes it possible that the air is admitted into the opening 41 as shown by an arrow A2 in FIG. 1 by taking advantage of the above slant 43 at the time of banking of the vehicle, so that an area of the opening 41 may be effectively applied to improve the above lightness, even if part of the opening 41 is covered with the middle cowl 50.

As shown in FIGS. 1 and 8 to 11, a blade 44 having an upper surface (44c) in the form of a slant surface 44c sloping more downward with the distance nearer to the fore is formed at the fore of the opening 41.

Taking this arrangement makes it possible that the blade 44 causes the ground pressure of the front wheel 1F to be increased, and also that the lightness at the time in the early stage of turning of the vehicle body is improved as well from the point of view in which the opening 41 is located at the rear of the blade 44 so that clinging of a run stream to the surface of each side cowl 30 when occurs behind the blade 44 is suppressed.

As shown in FIGS. 1 and 3, the blade 44 has at the transverse outside a projection 54 extending upward from the blade 44.

Taking this arrangement makes it possible that the run stream is so controlled that it flows in the longitudinal direction of the vehicle by applying the projection 54 to suppress the phenomenon that the flow of the run stream at the blade 44 is diffused in the transverse direction, thus allowing the straightening effect in the blade 44 to be heightened.

The top of the middle cowl 50 may form the projection (See FIGS. 12 and 13).

As shown in FIGS. 1 and 2, the screen 21 is arranged at the fore of the steering gear ST, and the opening 41 is exposed to the outside above the blade 44 in front view of the vehicle (FIG. 1).

Taking this arrangement makes it possible that the run stream having been straightened with the blade 44 is led to the rider side by taking advantage of the pivoting space S (See FIG. 4) of the steering gear ST, thus allowing not only the effect of protecting the rider against wind to be heightened with the screen 21 but also an adequate degree of run stream to be given to the rider, while allowing a negative pressure generated at the rear of the screen 21 to be suppressed.

An appropriate mounting structure may be applied to mount the upper cowl 40 and the middle cowl 50 to the body frame 10.

Mounting of the upper and middle cowls may be performed as described in the following, for instance.

According to the present embodiment, an inner panel 60 is arranged at the inside of the middle cowl 50 and a side panel 70 is arranged at the rear of the middle cowl 50. Thus, amounting structure of the upper cowl 40 and the middle cowl 50 will be described together with a mounting structure of the inner panel 60 and the side panel 70.

As shown in FIG. 5, a headlight 23 is fixed to the stay 22 in a manner that a headlight case 23c is positioned to the stay 22 with locating pins 23p, 23p, followed by being fastened thereto with screws 23b, 23b. Winkers 24 are each fixed to the stay 22 by fastening a winker-mounting arm 24a to the stay 22 with a screw 24b. It is noted that referring to FIG. 5, the upper half shows the state that the upper cowl 40 is mounted, and the lower half shows the state that the upper cowl 40 is removed.

As shown in FIGS. 8 and 9 as well as FIG. 5, the upper cowl 40 has at the bottom of the front fixing parts 45 and 46 respectively having holes for screw insertion.

The upper cowl 40 is fixed to the stay 22 by fastening the fixing part 45, together with the headlight 23, to the stay 22 with the screw 23b, while fastening the fixing part 46, together with the winker-mounting arm 24a, to the stay 22 with the screw 24b.

As shown in FIGS. 8 and 9 as well as FIG. 3, the upper cowl 40 has at the inner surface side of the top internal thread holes 47, 47 and 48 and at the inner side in the middle of the top an engaging hole 49. The upper cowl 40 also has at the fore and the rear of the bottom of the opening 41 engaging holes 40h1 and 40h2 for the inner panel 60 and the side panel 70.

Meanwhile, as shown in FIG. 3, the front cowl 20 has at the side a rearwardly extending mounting piece 20f as an integral part, and this mounting piece 20f has holes 27, 27 for screw insertion. The case 23c of the headlight 23 also has at the side a rearwardly extending mounting piece 23f as an integral part, and this mounting piece 23f has a hole 28 for screw insertion. Referring to FIG. 3, reference numeral 29 denotes a stay used for fixing of the front cowl 20 and provided in the form of a projection extending forward from the head pipe 11, and this stay 29 has at the outer side an engaging projection 29p.

The upper cowl 40 is fixed to the headlight case 23c by bringing the engaging hole 49 into engagement with the engaging projection 29p of the stay 29, followed by inserting the screw into the screw insertion hole 28 of the headlight case 23c from the inside to join the screw to the internal thread hole 48. The upper cowl 40 is also fixed to the side of the front cowl 20 by inserting the screws into the screw insertion holes 27, 27 of the front cowl 20 from the inside to join the screws to the internal thread holes 47, 47.

An engaging projection 61 of the inner panel 60 as described later is supposed to be detachably joined to the engaging hole 40h1 by being inserted therein. An engaging projection 58p of the middle cowl 50 as described later is supposed to be detachably joined to the engaging hole 40h2 by being inserted therein.

It is noted that referring to FIG. 8, a round hole H is specified as a clipping hole for harness fixing.

Figure 16:
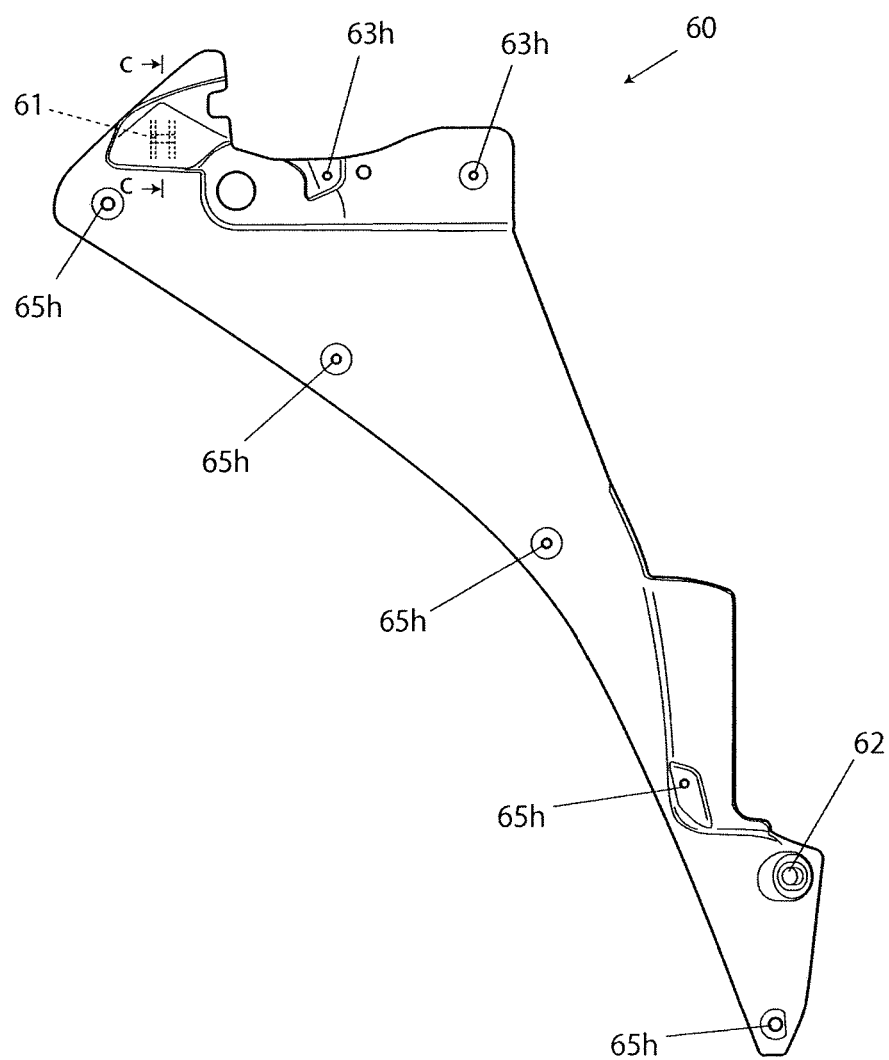
FIG. 16 is a side view of an inner panel 60.
Figure 17:
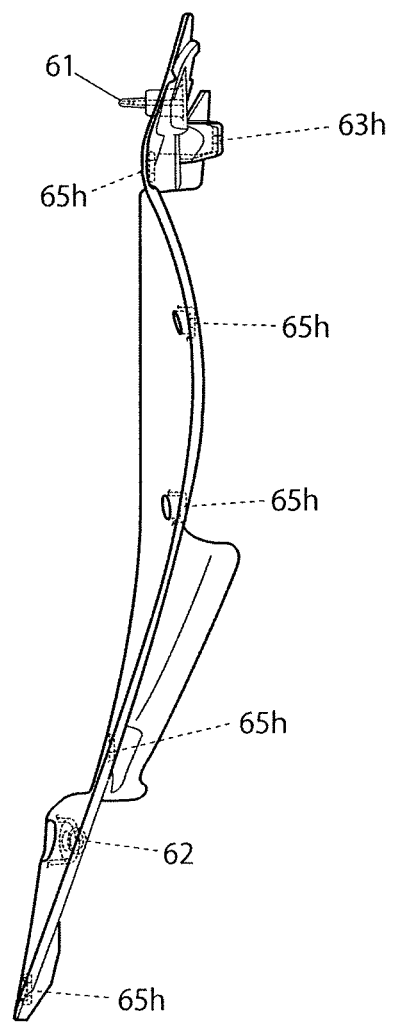
FIG. 17 is a front view of the inner panel 60.
Figure 18:
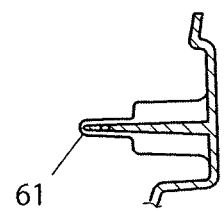
FIG. 18 is a sectional view taken along line c-c in FIG. 16.
Figure 19:
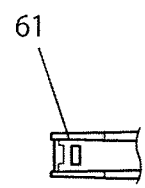
FIG. 19 is a plan view of the engaging projection 61 of FIG. 18.

FIG. 16 is a side view of the inner panel 60. FIG. 17 is a front view of the inner panel 60. FIG. 18 is a sectional view taken along line c-c in FIG. 16. FIG. 19 is a plan view of the engaging projection 61 of FIG. 18.

As shown in these FIGURES as well as FIG. 3, the inner panel 60 is detachably fixed to the side of the upper cowl 40 by engagement of the above engaging projection 61 at the top of the inner panel with the engaging hole 40h1 of the upper cowl 40. The inner panel 60 has at the bottom an engaging hole 62 adapted to engagement with a projection 15p at the top end of a stay 15s provided as the integral part in the form of a projection extending from an engine hanger bracket 15b at the bottom end of the down tube 15 toward the fore of the bottom of the engine hanger bracket. Engagement of the projection 15p with the engaging hole 62 allows the inner panel 60 to be located to the body frame 10 and at the same time, to be detachably fixed thereto.

The inner panel 60 has at the top more than one engaging hole 63h (two holes for the illustrated inner panel) and along the front edge more than one engaging hole 65h (five holes for the illustrated inner panel). Engaging projections 53p and 55p of the middle cowl 50 as described later are respectively supposed to be fitted in these engaging holes 63h and 65h, thus allowing the middle cowl 50 to be detachably joined to the outside of the inner panel 60 by inserting rivet-shaped inserting members (each of which is well known in itself, and the same shall apply hereinafter) into the insertion holes of the engaging projections 53p and 55p from the inside of the inner panel 60.

Figure 20:
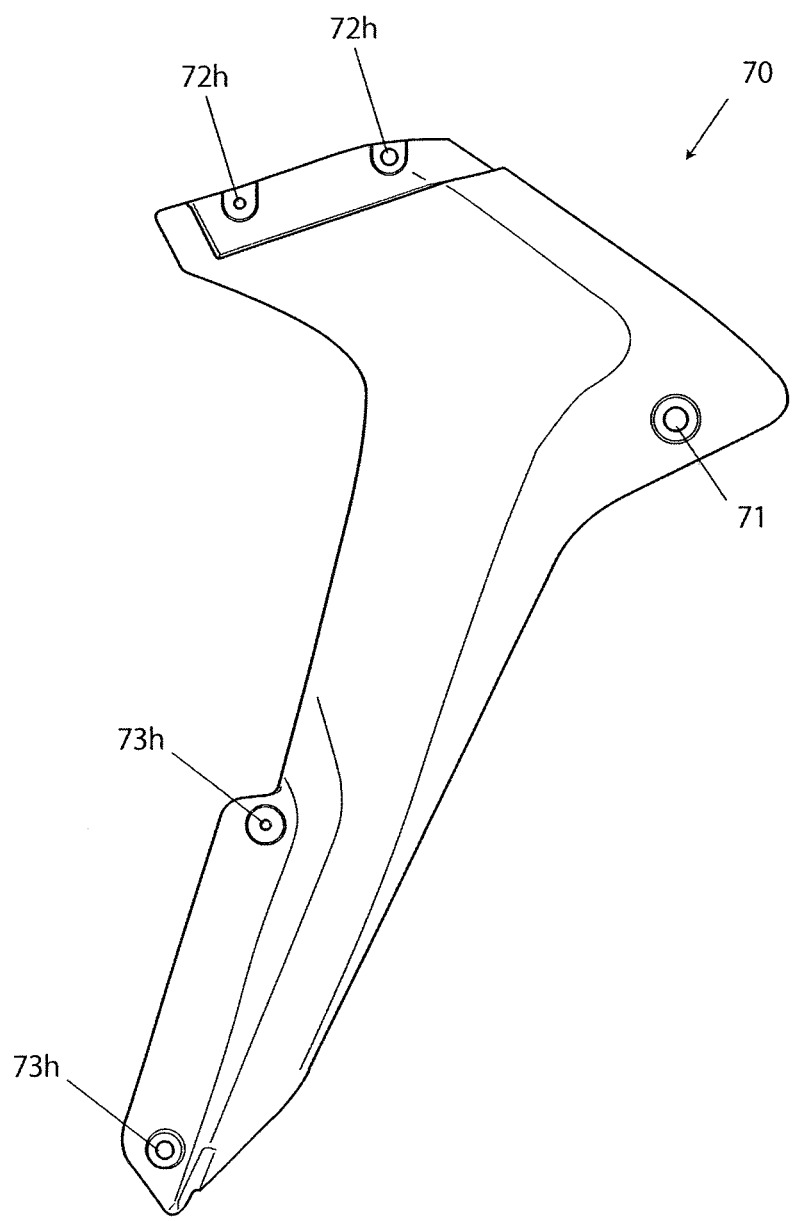
FIG. 20 is a side view of a side panel 70.
Figure 21:
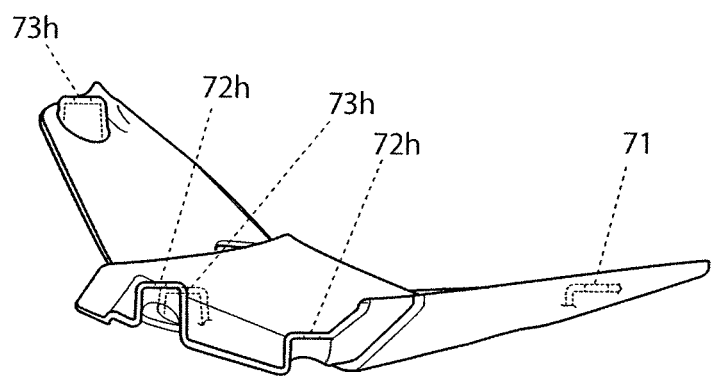
FIG. 21 is a plan view of the side panel of FIG. 20.

FIG. 20 is a side view of the side panel 70. FIG. 21 is a plan view of the side panel of FIG. 20.

As shown in these FIGURES as well as FIG. 3, the side panel 70 is fixed to the main frame 12 by fastening a fixing part 71 having a screw insertion hole to the main frame 12 with a screw 72.

The side panel 70 has at the top more than one engaging hole 72h (two holes for the illustrated side panel) and at the bottom more than one engaging hole 73h (two holes for the illustrated side panel). Engaging projections 56p and 57p of the middle cowl 50 as described later are supposed to be fitted in these engaging holes 72h and 73h, thus allowing the middle cowl to be detachably joined to the side panel 70 by inserting rivet-shaped inserting members into the insertion holes of the engaging projections 56p and 57p from the inside of the side panel 70.

As shown in FIGS. 12 and 13 as well as FIG. 3 and also as described the above, the middle cowl 50 has at the inner surface side the engaging projection 53p, more than one engaging projection 55p (five holes for the illustrated middle cowl) along the front edge, the engaging projections 56p and 57p at the top and the bottom of the rear edge and the engaging projection 58p in the middle of the top. In addition, the middle cowl 50 has at the rear of the top an engaging projection 59p equivalent to the engaging projection 58p.

Meanwhile, as shown in FIGS. 2 and 3, a side cover 90 used to cover the lower part of a fuel tank FT has an engaging hole 91 capable of being detachably engaged with the engaging projection 59p. The engaging hole 91 is in the same shape as the engaging hole 40h2 in the upper cowl 40.

Accordingly, the middle cowl 50 is detachably joined to the upper cowl 40, the side cover 90, the inner panel 60 and the side panel 71 by bringing the engaging projections 58p and 59p of the middle cowl into engagement with the engaging hole 40h2 of the upper cowl 40 and the engaging hole 91 of the side cover 90, then fitting the engaging projection 53p in the engaging hole 63h of the inner panel 60 to join together through the rivet-shaped inserting members, then fitting the engaging projection 55p in the engaging hole 65h of the inner panel 60 to join together through the rivet-shaped inserting members, and then fitting the engaging projections 56p and 57p in the engaging holes 72h and 73h of the side panel 70 to join together through the rivet-shaped inserting members.

Although the preferred embodiment of the present invention has been described, it is understood that the present invention is not limited to the above embodiment, and changes and modifications may be made according to circumstances without departing from the spirit or scope of the following claims of the present invention.

EXPLANATION OF REFERENCE NUMERALS

10: Body frame
11: Head pipe
ST: Steering gear
21: Screen
30: Side cowl
40: Upper cowl
41: Opening
43: Slant
44: Blade
50: Middle cowl
54: Projection

The invention claimed is:

1. A cowling structure of a riding-type vehicle comprising:
a head pipe mounted to the front of a body frame;
a steering gear supporting a front wheel rotatably, while being so held with said head pipe that the steering gear is capable of pivoting about an axis of said head pipe in a front of said head pipe;
a pair of side cowls, each arranged at a transverse outside portion of said body frame and having an opening formed therein, each of the side cowls configured in a manner so that the opening thereof communicates transversely to said body frame;
wherein in side view, said side cowls are lengthened up to the front of said head pipe, and said opening is in such a position that it is level with said head pipe and overlaps with said steering gear in the front of said head pipe;
wherein each of said side cowls comprises an upper cowl arranged at a top of the vehicle and a middle cowl arranged below said upper cowl, wherein a top end of said middle cowl is located more outside in a transverse direction than a bottom end of said upper cowl, while the bottom end of said upper cowl and the top end of said middle cowl are so located that said upper cowl and said middle cowl overlap with each other in said side view, and wherein at least part of said opening formed in said upper cowl is covered in said side view with the middle cowl top end, located away in the transverse direction from said opening.

2. The cowling structure of the riding-type vehicle according to claim 1, wherein a slant sloping more outward in the transverse direction of the vehicle body with a distance nearer to the top is formed at the top of the opening in said upper cowl.

3. The cowling structure of the riding-type vehicle according to claim 1, wherein a blade having an upper surface in the form of a slant surface sloping more downward with the distance nearer to a front of the vehicle is formed at a front of said opening.

4. The cowling structure of the riding-type vehicle according to claim 3, wherein said blade has at the transverse outside a projection extending upward from the blade.

5. The cowling structure of the riding-type vehicle according to claim 3, wherein a screen is arranged at a front of said steering gear, and said opening is exposed to the outside above said blade in front view of the vehicle.

6. The cowling structure of the riding-type vehicle according to claim 2, wherein a blade having an upper surface in the form of a slant surface sloping more downward with the distance nearer to a front of the vehicle is formed at a front of said opening.

7. The cowling structure of the riding-type vehicle according to claim 4, wherein a screen is arranged at a front of said steering gear, and said opening is exposed to the outside above said blade in front view of the vehicle.

* * * * *